United States Patent
Lastre et al.

(10) Patent No.: US 8,776,512 B2
(45) Date of Patent: Jul. 15, 2014

(54) SWING SYSTEM AND CONSTRUCTION MACHINERY OR VEHICLE COMPRISING A SWING SYSTEM

(75) Inventors: Frederic Lastre, Thionville (FR); Timo Zenner, Trierweiler-Fusenich (DE)

(73) Assignee: Volvo Construction Equipment AB, Eskilstuna (SE)

( * ) Notice: Subject to any disclaimer, the term of this patent is extended or adjusted under 35 U.S.C. 154(b) by 541 days.

(21) Appl. No.: 13/147,598

(22) PCT Filed: Feb. 3, 2009

(86) PCT No.: PCT/SE2009/000069
§ 371 (c)(1),
(2), (4) Date: Sep. 9, 2011

(87) PCT Pub. No.: WO2010/090555
PCT Pub. Date: Aug. 12, 2010

(65) Prior Publication Data
US 2011/0314802 A1    Dec. 29, 2011

(51) Int. Cl.
*F16D 31/02*    (2006.01)
(52) U.S. Cl.
USPC .............................................. 60/436; 60/442
(58) Field of Classification Search
USPC ....................... 60/436, 441, 442; 91/1, 41, 42
See application file for complete search history.

(56) References Cited

U.S. PATENT DOCUMENTS

| | | | |
|---|---|---|---|
| 4,464,898 A * | 8/1984 | Aoyagi et al. | 60/436 |
| 4,615,174 A | 10/1986 | Nagahara | |
| 6,339,929 B1 | 1/2002 | Udagawa et al. | |
| 7,275,474 B2 * | 10/2007 | Larkin et al. | 91/1 |

FOREIGN PATENT DOCUMENTS

| | | |
|---|---|---|
| EP | 0056865 A1 | 8/1982 |
| EP | 0209123 B1 | 1/1987 |

* cited by examiner

*Primary Examiner* — Michael Leslie
(74) *Attorney, Agent, or Firm* — WRB-IP LLP

(57) ABSTRACT

A swing system for construction machinery or a vehicle, particularly an excavator or a crane, includes a swing brake for blocking or unblocking a rotational movement of a first portion of the vehicle relative to a chassis portion of the vehicle, and a swing pump and a swing motor are provided for performing the rotational movement. The swing pump can be positioned in a neutral position where no rotational movement of the first portion takes place. At least one brake control actuator is provided for automatically engaging the brake when the swing pump is in its neutral position. The swing system can provide an improved control of the swing movement on a slope and an improved comfort during operation of the swing movement.

14 Claims, 4 Drawing Sheets

SWING SYSTEM AND CONSTRUCTION MACHINERY OR VEHICLE COMPRISING A SWING SYSTEM

BACKGROUND AND SUMMARY

The invention relates to a swing system and a construction machinery or a vehicle, particularly an excavator or a crane, comprising a swing system.

It is known in the art that the upper-carriage of an excavator is moving against the undercarriage (chassis) with a rotational movement called "swing" movement, controlled by the operator via a control lever called "joystick". Such a known swing system 100 is shown in FIG. 2. In the Figure a hydraulic manipulator 26 embodied as a joystick controls the rotational movement of the upper-carriage of an excavator relative to the undercarriage of the excavator. This rotational movement can be to the left-hand side or to the right-hand side direction.

In a so called "closed loop" system, the swing system 100 is actuated by a swing motor 12, for instance a fixed displacement piston motor, which includes a swing brake system 32, for instance comprising a multi-discs brake 32a which is applied via a brake cylinder and spring 32b when no control pressure is present, and a swing pump 10, e.g. a variable displacement piston pump comprising a swash plate 10a, the displacement of which is controlled by the joystick signal to a swash plate control device 24. The maximum working pressure of the swing system is limited by two pressure relief valves 18. The swing system 100 includes a charging pump 14 which is maintaining the pressure in this arrangement through two charging valves 16 to prevent cavitations. The pressure relief valves 18 and the charging valves 16 are arranged in parallel to each other and connected to the right-hand side and the left hand side of swing pump 10 and the swing motor 12.

The charging pump 14 can also be used as a pressure supply to a servo system of the excavator that is supposed to supply additional hydraulic pressure for example for the operation of the hydraulic manipulator 26 or for releasing of the swing brake 32a through a time delay valve 30.

The charging pressure, typically 20 to 40 bars, is limited by a pressure relief valve 20, and the charging oil is supplied to the components through a filter 22 for better reliability of the system.

The hydraulic pressure of the hydraulic components such as the charging pump 14, the swing pump 10, the swing motor 12, the pressure relief valve 20, the manipulator 26 and the time delay valve 30 can be released into a common tank T or into a multitude of tanks.

By way of example, a time delay typically between 3 to 7 seconds to apply the swing brake 32a in case of no use of the manipulator 26 is made by the time delay valve 30; The time delay valve 30 collects the signal from the hydraulic manipulator 26 via a shuttle valve 28.

When the joystick signal is above a threshold, typically above e.g. 5 bars, the time delay valve 30 supplies a servo pressure to the swing brake 32a which is then released, providing a free swing movement.

When the joystick signal is below the threshold, the time delay valve 30 will throttle the oil going from the swing brake 32a to the tank T, thus generating a certain time delay the length of which is depending on the oil viscosity and the volume of oil in the swing brake system 32.

In such a conventional "closed loop" system any additional torque induced for instance by the attachment load of the excavator standing or driving on a slope is compensated by a counter torque induced by the swing pump 10 and the swing motor 12 until eventually the swing brake 32 system of the swing motor 12 is applied. The swing brake 32a applies automatically after a certain time of non-usage of the swing operation, typically after 3 to 7 seconds.

The hydraulic system of the swing motor 12 and the swing pump 10 has internal leakages. In case the excavator is in a non-horizontal position (for instance when standing or driving on a slope) these leakages (and the gravitation force) may eventually cause the upper-carriage of the excavator to change its position (to "drift") in a rotational manner relative to the under-carriage of the excavator with time when the swing brake 32a is not applied. The speed of the movement depends on the amount of internal leakage. However, in some working conditions, the operator needs to keep the position of the upper-carriage relative to the under-carriage without being disturbed by such an unwanted drift movement of the upper-carriage.

For this purpose, a manual way to apply the swing brake 32a by actuating an electric switch or pedal, for example, may be provided to the operator (not shown). However, this requires the operator to apply the swing brake 32a manually while using the swing system, making the swing operation more difficult.

EP 0056865 A1 discloses a swing system and a method for construction machinery or a vehicle, comprising a swing brake for blocking or unblocking a rotational movement of portion of the construction machinery. The rotational movement is performed by a swing pump and a swing motor, wherein the swing pump can be positioned in a neutral position where no rotational movement of the portion of the construction machinery takes place. A brake actuator actually engages the swing brake when the swing pump is positioned in its neutral position.

It is desirable to provide a swing system whose swing brake system facilitates a swing operation and provides a more comfortable handling of the swing system for the operator of a construction machinery or vehicle. It is also desirable to provide a construction machinery or vehicle comprising a swing system whose swing brake system facilitates a swing operation and makes it more comfortable for an operator.

A swing system for a construction machinery is proposed, particularly for an excavator or a crane, or a vehicle is proposed comprising a swing brake for blocking or unblocking a rotational movement of a first portion of the construction machinery or vehicle relative to a chassis portion of the construction machinery or vehicle, and comprising a swing pump and a swing motor provided for performing the rotational movement. The swing pump can be positioned in a neutral position where no rotational movement of the first portion of the construction machinery or vehicle takes place (for instance in situations where the rotational movement changes from a right-hand side rotational movement to a left-hand side rotational movement (or vice versa)). At least one brake control actuator is provided for automatically engaging the swing brake when the swing pump is positioned in its neutral position.

According to the invention, a first sensor is coupled to the swing pump for detecting a neutral position of the swing pump where no rotational movement of the first portion takes place (for instance in situations where the rotational movement changes from a right-hand side rotational movement to a left-hand side rotational movement (or vice versa)). The operational state of the swing pump can be detected accurately. The sensor is an angle sensor for detecting a position of a swash plate of the swing pump. The position of the swash plate can be easily accessed.

The expression "construction machinery" includes stationary construction equipment or construction machines as well as mobile construction equipment or construction vehicles.

The swing pump and the swing motor may be adapted and operable to neutralize the effect of a torque induced by a load by applying a corresponding counter torque of equal or almost equal amount and opposite direction.

Favourably, the risk that an unwanted drift of the first portion of the construction machinery or vehicle, e.g. an upper-carriage of an excavator or a crane, relative to an under-carriage of the construction machinery or vehicle will occur, is reduced or even avoided. Such a drift may occur especially when the construction machinery or vehicle is positioned or moving on a slope and has a load attached. The present invention reduces the swing drift of a construction machinery or vehicle, particularly of an excavator of crane, equipped with a closed loop swing system, by automatically applying the swing brake when the upper-carriage should be standing still (i.e. when it should keep its position and orientation relative to the under-carriage on which it is mounted). Further, the brake control actuator according to an aspect of the invention can be easily added to a known swing system, which provides a known swing brake system as described above as a fall back system, or can replace the conventional time delay valve (30 in FIG. 2) which usually activates the swing brake.

The present invention gives the operator a higher comfort by automatically applying the swing brake when the upper-carriage is supposed to be standing still (i.e. not rotating relative to the under-carriage or chassis on which it is mounted), thus considerably reducing or even avoiding the risk of an unwanted drift movement due to internal leakages in the hydraulic system of the swing motor and swing pump. The operator does not need to eventually apply manually the swing brake to overcome the drift. The invention, according to an aspect thereof, provides an improved control of the swing movement in cases where the construction machinery (e.g. excavator or crane) or vehicle is positioned or driving on a slope and thus an improved comfort for the operator.

As the swing drift is significantly reduced (or even avoided) without any human intervention, the construction machinery or vehicle performance is improved, in this case, by reducing (or avoiding) the swing drift. In case of a failure of the at least one brake control actuator, the system can fall back to its known behaviour (where the swing pump and the swing motor will slow down the unwanted drift of the upper-carriage relative to the under-carriage by compensating the additional torque exerted by the load with a corresponding counter torque) with a larger drift but still be operable. Particularly, the at least one brake control actuator can be operated electrically. For instance, the at least one brake control actuator can be a solenoid valve which receives control signals from a control unit, for instance an Electronic Control Unit or abbreviated "ECU".

According to a favourable embodiment of the invention, the at least one brake control actuator can be electrically controlled for activating or deactivating the swing brake. The electric control is relatively fast so that the swing brake can be applied virtually immediately when required. Particularly, the at least one brake control actuator can be a solenoid valve.

Usually, the rotational movement of the first part of the construction machinery or vehicle is controlled by a manipulator operated by the operator of the construction machinery or vehicle. According to a favourable embodiment of the invention, a control unit can be provided for controlling the at least one brake control actuator depending on the operational state of the swing pump and of the manipulator. Advantageously, such a control unit as well as the at least one brake control actuator and the first sensor for detecting the neutral position of the swing pump can easily be added retroactively to a known swing system.

According to a favourable embodiment of the invention, a second sensor can be provided for detecting an operational state of the manipulator. By identifying the operational state of the manipulator, e.g. a joystick, it can be determined if the neutral position of the swing pump is reached because the swing operation has come to a wanted standstill (state 1) or if the swing direction is changing and the neutral position is only a short and transient position of the swing pump (state 2). In detecting and identifying these two different states the risk of an erroneous and unwanted application of the swing brake in state 2 can be considerably reduced or even be avoided.

According to a favourable embodiment of the invention, the second sensor can be a pressure sensor detecting a pressure caused by activating the manipulator.

Hence, a safe identification of the operational state of the manipulator is possible.

According to a favourable embodiment of the invention, an actuator can be provided for manually activating the at least one brake control actuator for activating the swing brake. The actuator can be located proximate to the manipulator so that the operator can easily cause the swing brake to be applied.

According to a favourable embodiment of the invention, the action of the brake control actuator can be deactivated if the swing pump is outside its neutral position. In doing so, it can be avoided that the swing brake is applied if the swing speed is too high. Expediently, the operation of the brake control actuator can be limited to a pre-determined range or interval of the swing pump displacement close to the zero position of the swing pump, i.e. close to its neutral position where no rotational movement takes place, e.g. to values equally to or less than ±5 degrees around the zero or neutral position, and here in particular to values equally to or less than ±2 degrees around the zero or neutral position, in particular to values equally to or less than ±1 degrees around the zero or neutral position of the swing pump.

According to another aspect of the invention, a method for operating a swing system is proposed, comprising the steps of (i) identifying a neutral position of a swing pump where no rotational movement of the first portion of the construction machinery or vehicle takes place (for instance in situations where the rotational movement changes from a right-hand side rotational movement to a left-hand side rotational movement (or vice versa)), and (ii) activating at least one brake control actuator for automatically engaging a swing brake when the swing pump is in its neutral position. The neutral position of the swing pump where no rotational movement of the first portion of the construction machinery or vehicle takes place is identified by determining a position of a swash plate of the swing pump with an angle sensor.

Advantageously, by applying this method the risk of an unwanted swing drift can be considerably reduced or even be avoided.

According to a favourably method step, an operational state of a manipulator for controlling a rotational movement of a first portion of the vehicle relative to a chassis portion of the vehicle can be identified. The operational state of the manipulator can be used to determine whether the application of the swing brake should be performed or inhibited.

According to a further favourable method step, the swing brake can be applied only if the manipulator is in an inactive operational state. Thereby, the risk of an erroneous and unwanted application of the swing brake at a high speed of the swing movement can be considerably reduced or even be avoided.

According to a further favourable method step, an activation of the swing brake by the operator can be blocked if the swing pump is outside its neutral position. However, the operator may manually engage the swing brake, e.g. via a separate switch arranged on or near the manipulator. Thus, application of the swing brake can be prevented when the swing movement passes zero without any intention of the operator to stop there (for example when the swing direction is changing from the right swing to the left swing (or vice versa)). An application of the swing brake in case the actual swing speed is too high can also be prevented (see also above).

According to still another aspect of the invention, a construction machinery is proposed, particularly an excavator, comprising a swing system according to anyone of the above described features of the swing system such feature taken alone or in combination with any of the other features.

The invention, according to an aspect thereof, can be applied to construction machinery such as excavators or cranes, or any other vehicle or part of it which perform a swing movement or rotational movement. The vehicles can be wheel-borne, track-borne or running on rails. The construction machinery can also be wheel-borne, track-borne or running on rails or stationary.

BRIEF DESCRIPTION OF THE DRAWINGS

The present invention together may best be understood from the following detailed description of the embodiments of the invention, but not restricted to these embodiments, wherein is shown schematically.

DETAILED DESCRIPTION

Figure 1:
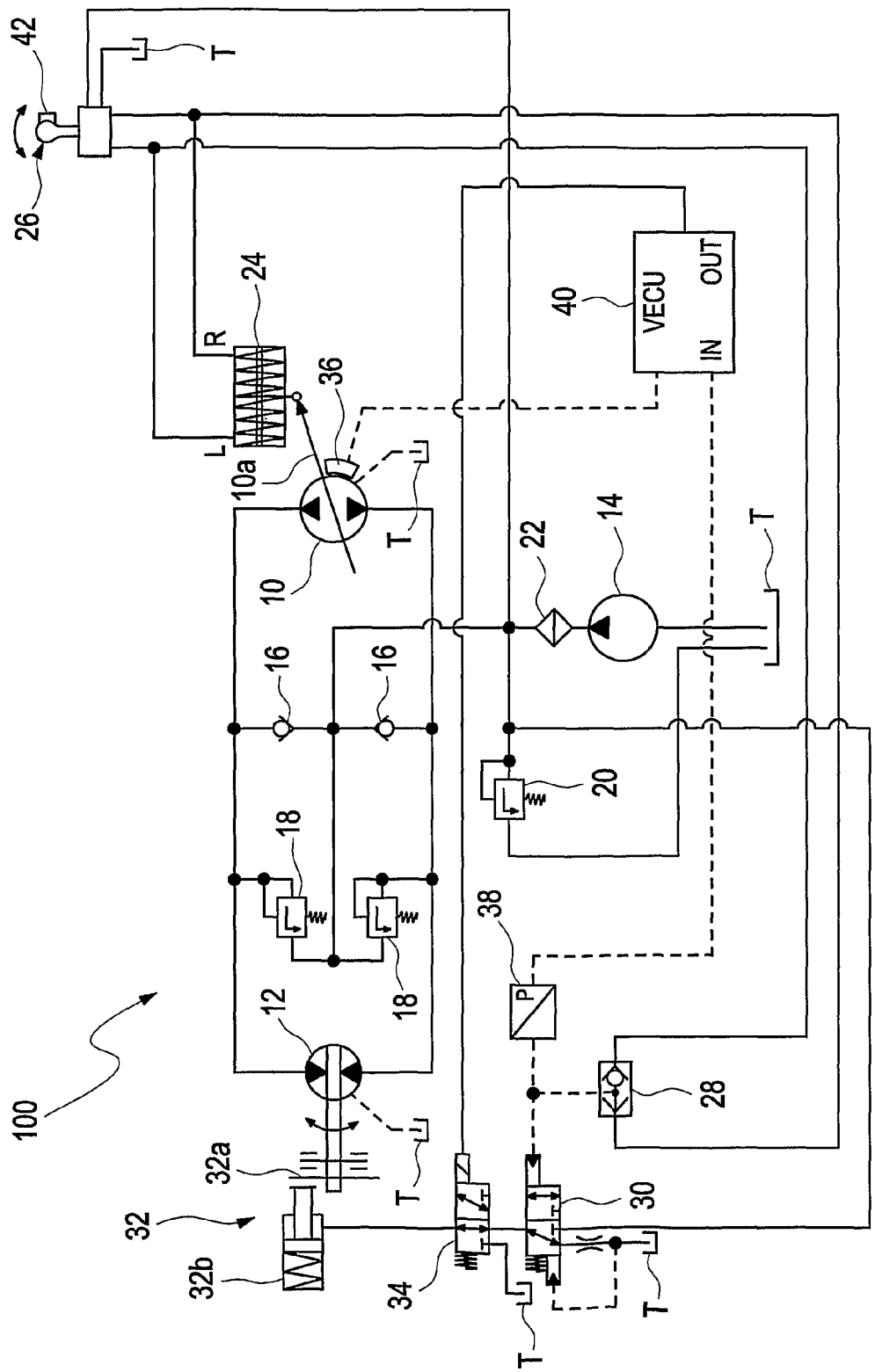
FIG. 1 an example of a swing system according to the invention.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

FIG. 1 depicts schematically an example embodiment of a swing brake system 100 according to the invention. The invention can be applied additionally to a conventional swing system as described in FIG. 2 or can replace a time delay valve 30 which in such conventional swing system activates the swing brake system 32 and causes the swing brake 32a to be applied. In the example embodiment of the invention depicted in FIG. 1, the invention is by way of example added to such a conventional swing system as described more in detail in FIG. 2.

Figure 4:
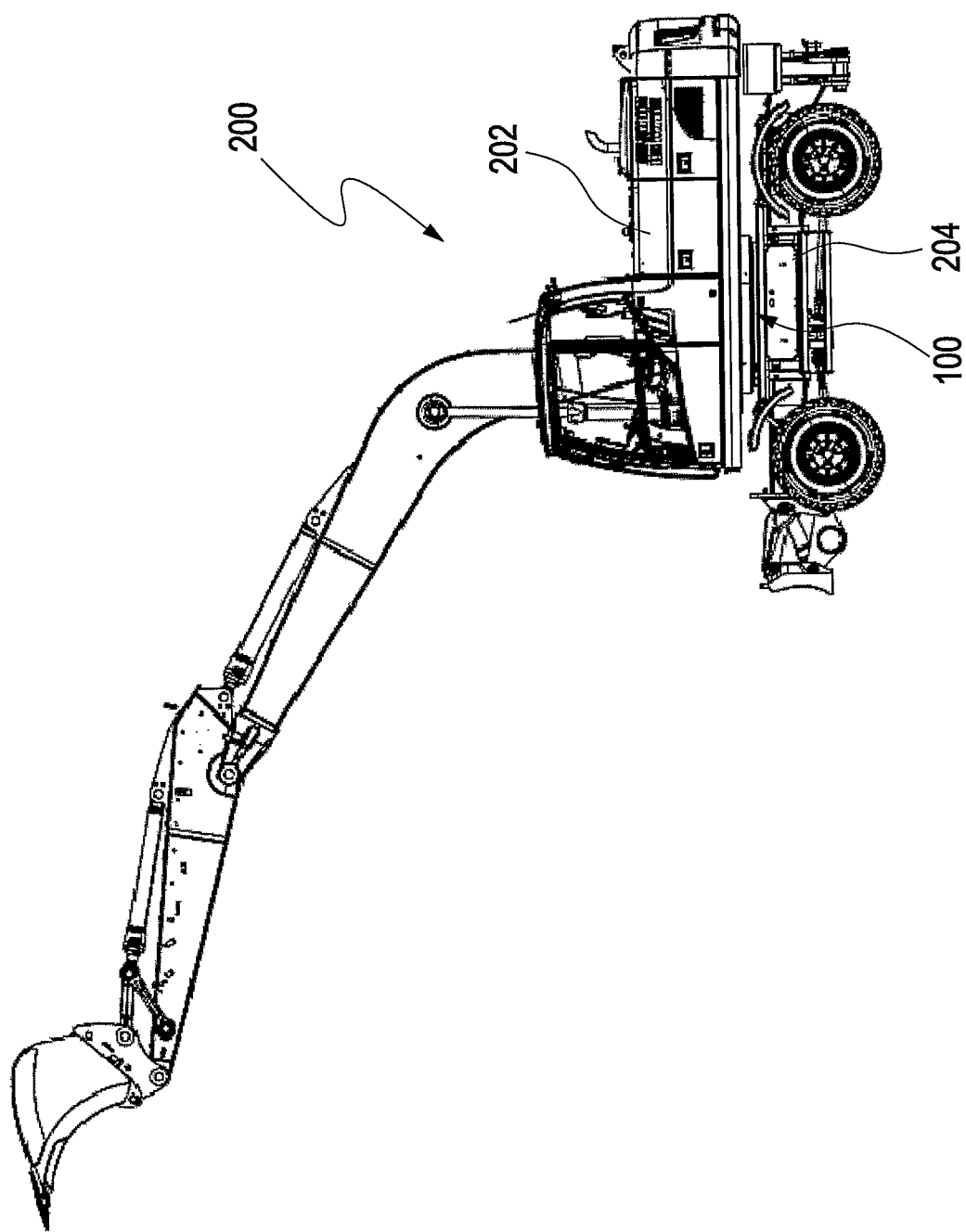
FIG. 4 an excavator according to the invention.

With additional reference to FIG. 4 showing an excavator 200 with an upper-carriage 202 and an under-carriage 204 and a swing system 100, a manipulator 26 (shown in FIG. 1), for instance a hydraulic manipulator embodied as a joystick, controls a rotational movement of the upper-carriage 202 relative to the undercarriage 204 of the excavator 200 (FIG. 4). This rotational movement can be to the left-hand side or to the right-hand side direction seen from above. The swing pump 10 reverses the swing direction accordingly.

In a so called "closed loop" system, the swing system 100 is actuated by a swing motor 12, for instance a fixed displacement piston motor, which includes a swing brake system 32 comprising a swing brake 32a, for instance a multi-discs brake which is applied by a brake cylinder and spring 32b when no control pressure is present, and a swing pump 10, e.g. a variable displacement piston pump comprising a swash plate 10a, the displacement of which is controlled by the joystick signal to a swash plate control device 24. The maximum working pressure of the swing system 100 is limited by two pressure relief valves 18 which act, for the right-hand side rotational movement and for the left-hand side rotational movement, respectively, of the upper-carriage (202 in FIG. 4) relative to the undercarriage (204 in FIG. 4) of the excavator (200 in FIG. 4).

The swing system 100 includes a charging pump 14 which maintains the pressure in this arrangement through two charging valves 16 dedicated for the right-hand side rotational movement and for the left-hand side rotational movement, respectively, to prevent the occurrence of cavitations in the hydraulic pipes.

The pressure relief valves 18 and the charging valves 16 are arranged in parallel to each other and connected to the right-hand side and the left hand side hydraulic circuit of the swing pump 10 and the swing motor 12.

The charging pump 14 can be used as well as a pressure supply to a servo system of the excavator that is supposed to supply additional hydraulic pressure for example for the operation of the hydraulic manipulator 26, e.g. a joystick, or for releasing of the swing brake system 32 through a time delay valve 30.

The charging pressure, which is typically in a range of 20 to 40 bars, is limited by a pressure relief valve 20, and the charging oil is supplied to the components through a filter 22 for better reliability of the swing system 100.

Figure 2:
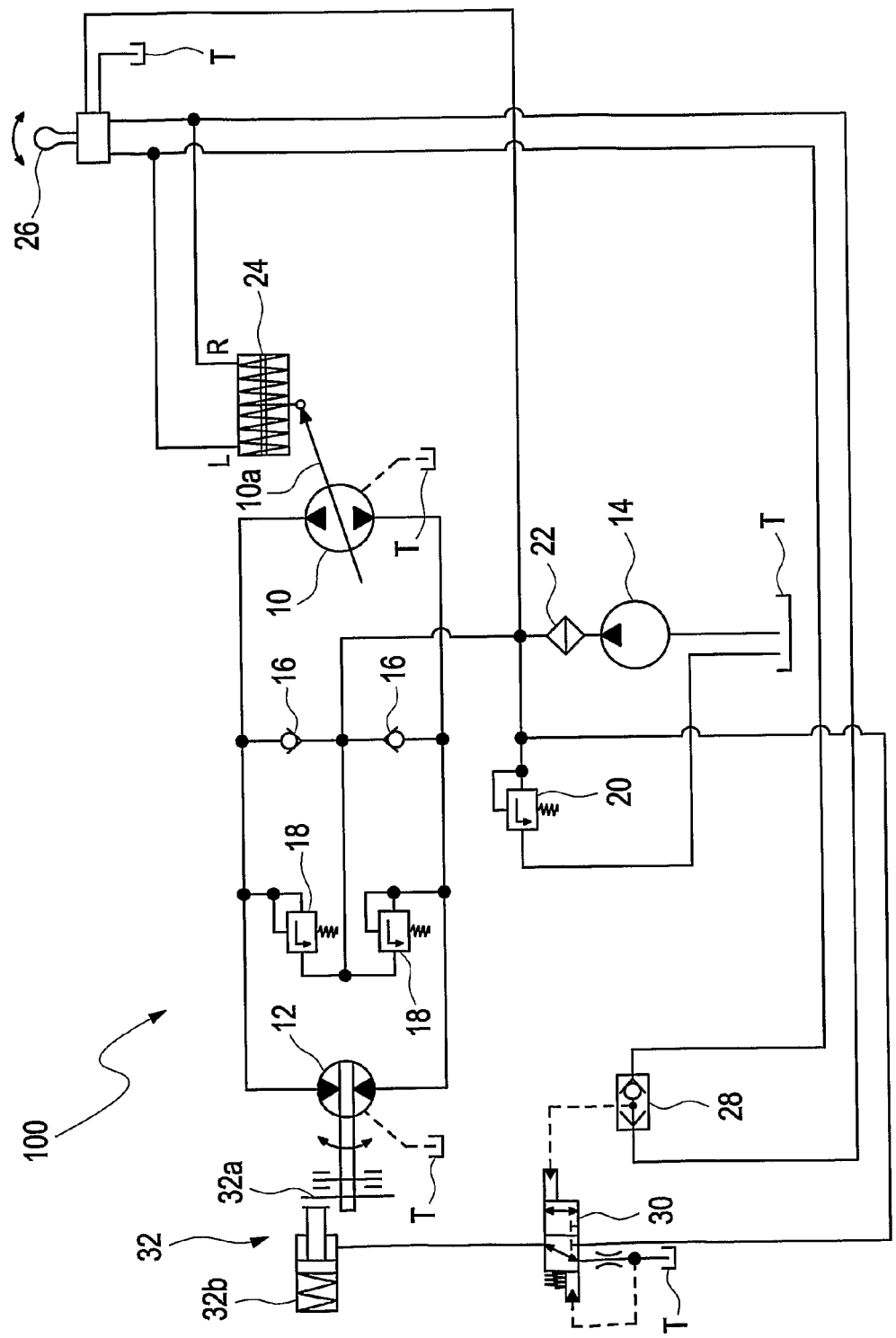
FIG. 2 a swing system of an excavator according to prior art.

In the conventional system shown in FIG. 2, the time delay valve 30 supplies a servo pressure to the swing brake system 32 causing the brake cylinder and spring 32b to withdraw so that the swing brake 32a is then released, providing a free swing movement when the manipulator signal is above a threshold, typically above e.g. 5 bars. When the signal is below the threshold, the time delay valve 30 will throttle the oil going from the swing brake system 32 to a tank T, thus generating a time delay whose length is depending on the oil viscosity and the volume of oil in the swing brake system 32.

Other than in a conventional "closed loop" system where the torque induced by the attachment load when the excavator 200 (FIG. 4) is located on a slope is held by the swing pump 10 and the swing motor 12 until the swing brake 32a included in the swing motor 12 is applied after a certain time of non-usage of the swing, the swing system according to the invention as described in FIG. 1 will considerably reduce the risk (or even avoid it) that the upper-carriage 202 (FIG. 4) will change its position in a rotational manner with respect to the undercarriage 204 (FIG. 4) of the excavator 200 (FIG. 4) during this time.

In a "closed loop" system without internal leakages (or with considerably reduced leakages)—as described in FIG. 1—, the swing motor 12 has a zero speed when the swing pump displacement, indicated by the position of the swash plate 10a, is equal to zero, i.e. when the swing pump 10 is in its neutral position between the right-hand side rotational movement and the left-hand side rotational movement of the upper-carriage.

In a conventional swing system like in FIG. 2, there is a time delay of typically between 3 to 7 seconds to apply the swing brake 32a via the brake cylinder and spring 32b in case the manipulator 26 is not used. This time delay is effected by the time delay valve 30. The time delay valve 30 collects a signal from the manipulator 26 via the shuttle valve 28 which signal indicates whether the manipulator is operated or not.

According to the invention (as described in FIG. 1), the application of the swing brake 32a may be controlled preferably by one or more electrically controllable components in order to apply the swing brake 32a immediately after the swing pump displacement is at its neutral position where no rotational movement of the upper-carriage of the excavator takes place relative to the under-carriage of the excavator (for instance in situations where the rotational movement changes from a right-hand side rotational movement to a left-hand side rotational movement (or vice versa)). Preferably, a brake control actuator 34 is provided for selectively actuating the swing brake system 32 and the swing brake 32a, respectively, when the swing pump 10 is in its neutral position. Favourably, the brake control actuator 34 can be embodied as a solenoid valve arranged in a fluid connection to the swing brake system 32.

For instance, the neutral position of the swing pump 10 may be determined by a neutral position of a swash plate 10a of the swing pump 10 which is used to change the pump displacement. By providing a sensor 36 at the swing pump 10, detecting e.g. the angular position of the swash plate 10a, it is possible to determine the moment when the swing pump displacement is equal to zero, giving the neutral position of the swing pump 10. It is to be understood that the "zero" position may include a tolerance, e.g. ±0.2 degree around zero degree for a reliable operation of the angle sensor 36. When the neutral position of the swing pump 10 is detected, i.e. when the angular position of the swash plate 10a is within the allowed range around zero degree, the swing brake 32a can be automatically applied by the brake control actuator 34 embodied as a solenoid valve. In this case, the swing brake 32a is applied immediately as soon as the signal is send to the solenoid of the brake control actuator 34.

When the operator is changing the swing direction, the swash plate 10a of the swing pump 10 will be shortly in zero position. To prevent the application of the swing brake 32a in case of "reversing" the swing direction by the operator, an additional signal can be used together with the sensor signal.

The additional signal indicates whether or not the manipulator 26 for swing control is actuated by the operator. For example, in case of a hydraulic manipulator, e.g. a joystick, this can be achieved by the usage of a second sensor 38, e.g. a pressure switch or a pressure sensor that senses whether or not a control pressure from the manipulator 26 is sent to the swing pump 10. For achieving this, the second sensor 38 may receive a pressure signal from the shuttle valve 28.

In this case, the swing brake 32a will be applied only when the angle sensor 36 is at zero (or within the already mentioned tolerance range around zero), and the additional signal from the manipulator 26 is at zero (or within its tolerance range) as well.

This solution can be used as an addition to the conventional brake control system comprising a time delay valve 30 in case the reliability of a pure electrical control of the swing brake 32a would not be sufficient.

A Vehicle Electronic Control Unit (VECU) 40 (whose inputs are connected with the outputs of sensors 36 and 38 and whose control output is connected with the; control input of the brake control actuator 34) is used to control the signal to the brake control actuator 34 embodied as a solenoid valve.

The brake control actuator 34 causes the swing brake 32a to engage immediately when an electric signal is sent from the VECU 40 to the solenoid of the brake control actuator 34.

The first sensor 36 is indicating the displacement of the swing pumpi 0. The second sensor 38 is employed to check whether or not the manipulator 26 is used for swing motion.

When the first sensor 36 is indicating a "zero" pump displacement and the second sensor 38 is indicating a "no usage" of the swing manipulator 26 (as described above) the VECU 40 is sending an electrical signal to the brake control actuator 34, making the swing brake 32a being applied immediately.

It is to be noted that in case of an electronic manipulator 26, there is no need of the second sensor 38, as the VECU 40 can detect directly whether or not the swing manipulator 26 is used.

As an additional feature of the swing system of FIG. 1, a switch 42 arranged for example at, on or nearby the swing manipulator 26 can be used in parallel by the operator to manually control the application of the swing brake 32a. In this case, to prevent the manual application of the swing brake 32a by the operator at a too high swing speed, the signal from the sensor 36 can be used to limit the possible usage of this switch 42, i.e. the swing brake 32a can be applied by the switch 42 only if the swing pump displacement is close to "zero", e.g. ±1 degrees.

Preferably in case of failure of the electrical system detected by the VECU 40, e.g. in case of a sensor failure, the system can be de-activated automatically. The safety and possibility to operate the swing system in the conventional (known) way via the time delay valve 30 is also still possible (however, depending on the situation in such cases the unwanted "drift" of the upper-carriage will be considerably higher).

Figure 3:
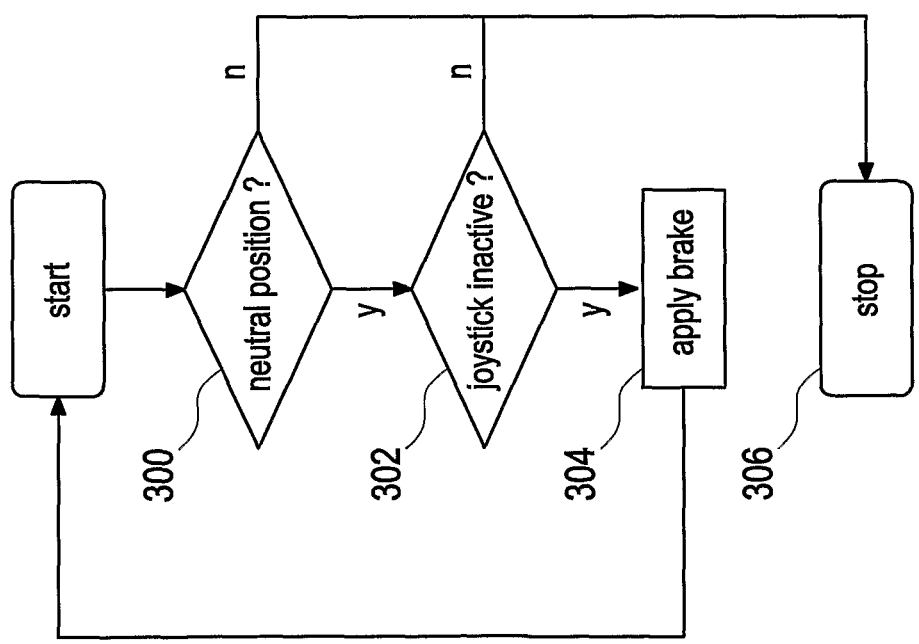
FIG. 3 a flow chart illustrating the operation method during swing operation according to the invention.

FIG. 3 illustrates a typical flow diagram of a method for operating a swing system 100 according to the invention as for instance described in FIG. 1.

Referring to the swing system depicted in FIG. 1, after the start in step 300 in FIG. 3, the operational state of a swing pump 10 is identified. If the swing pump 10 is in its neutral position ("y" in the flow chart), the operational state of a manipulator 26 for activation of the swing pump 10 is identified in step 302 in FIG. 3. If the manipulator 26 is inactive ("y" in the flow chart), then in step 304 in FIG. 3 a brake control actuator 34 is automatically activated and causes the swing brake 32a to block the rotational movement of the upper-carriage because the swing pump 10 is detected to be in its neutral position and the manipulator 26 is detected to be inactive. When the swing brake 32a is applied, the routine as described in FIG. 3 can start again.

If in step 300 in FIG. 3 it is decided that the swing pump 10 is not in its neutral position ("n" in the flow chart) the flow ends in step 306 in FIG. 3. If in step 302 in FIG. 3 it is decided that the manipulator 26 is not in its neutral position ("n" in the flow chart) the flow ends in step 306 in FIG. 3, too.

FIG. 4 indicates a vehicle 200 embodied as an excavator which employs a swing brake system 100 as described in FIG. 1 and operated as described in FIG. 3. The swing brake system 32 comprises a swing brake 32a (FIG. 1) for blocking or unblocking a rotational movement of a first portion 202 (that contains the upper-carriage, the cabin, the engine compartment, the load handling tools, the load, etc.) of the vehicle 200 relative to a chassis portion 204 (that contains the undercarriage) of the vehicle 200. Favourably, according to the invention, an improved control of the swing movement on a slope and thus an improved comfort for the operator can be achieved.

As the swing drift is significantly reduced by the use of the invention without any human intervention, the machine performance is improved. In case of electrical failure, the swing brake system 100 can go back to known behaviour as described in FIG. 2, with a considerably larger drift, but can still be operated.

The invention claimed is:

1. A swing system for a construction machinery or a vehicle, comprising a swing brake for blocking or unblocking a rotational movement of a first portion of the construction machinery or the vehicle relative to a chassis portion of the construction machinery or the vehicle, and further comprising a swing pump and a swing motor provided for performing the rotational movement, wherein the swing pump can be positioned in a neutral position where no rotational movement of the first portion takes place, wherein at least one brake control actuator is provided for automatically engaging the swing brake when the swing pump is positioned in its neutral position, and a first sensor is coupled to the swing pump for detecting the neutral position of the swing pump, wherein the first sensor is an angle sensor for determining a position of a swash plate of the swing pump.

2. The swing system according to claim 1, wherein the at least one brake control actuator is electrically controlled for activating or deactivating the brake.

3. The swing system according to claim 2, wherein the at least one brake control actuator is a solenoid valve.

4. The swing system claim 1, comprising a manipulator for controlling the rotationalmovement of the first portion of the construction machinery or vehicle, wherein a control unit is provided for controlling the at least one brake control actuator depending on the operational state of the swing pump and of the manipulator.

5. The swing system according to claim 4, wherein a second sensor is provided for detecting an operational state of the manipulator.

6. The swing system according to claim 5, wherein the second sensor is a pressure sensor detecting a pressure caused by activating the manipulator.

7. The swing system according to claim 1, wherein an actuator is provided for and adapted to manually activating the at least one brake control actuator.

8. The swing system according to claim 7, wherein an action of the actuator is deactivated or the actuator is blocked if the swing pump is positioned outside its neutral position or outside a predetermined interval around its neutral position.

9. A method for operating a swing system according to claim 1, comprising the steps of
identifying a neutral position of a swing pump where no rotational movement of the first portion of the construction machinery or vehicle takes place;
activating at least one brake control actuator for automatically engaging a swing brake when the swing pump is in its neutral position, characterized by
identifying the neutral position of a swing pump where no rotational movement of the first portion of the construction machinery or vehicle takes place by determining a position of a swash plate of the swing pump with an angle sensor.

10. The method according to claim 9, further identifying an operational state of a manipulator for controlling a rotational movement of the first portion of the construction machinery or vehicle relative to the chassis portion of the construction machinery or vehicle.

11. The method according to claim 10, further applying the swing brake only if the manipulator is in an inactive operational state.

12. The method according to claim 9, further blocking an activation of the swing brake by the operator if the swing pump is outside its neutral position or outside a predetermined interval around its neutral position.

13. Construction machinery or a vehicle comprising a swing system according to claim 1.

14. Construction machinery or a vehicle applying a method according to claim 11.

* * * * *